US011881921B2

(12) United States Patent
Wang et al.

(10) Patent No.: US 11,881,921 B2
(45) Date of Patent: Jan. 23, 2024

(54) MULTI-BAND DIRECTIONAL SCANNING

(71) Applicant: Hewlett Packard Enterprise Development LP, Houston, TX (US)

(72) Inventors: Xuefu Wang, Beijing (CN); Jianpo Han, Beijing (CN); Kuanyue Li, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 182 days.

(21) Appl. No.: 17/600,195

(22) PCT Filed: Apr. 24, 2019

(86) PCT No.: PCT/CN2019/084070
§ 371 (c)(1),
(2) Date: Sep. 30, 2021

(87) PCT Pub. No.: WO2020/215242
PCT Pub. Date: Oct. 29, 2020

(65) Prior Publication Data
US 2022/0190904 A1   Jun. 16, 2022

(51) Int. Cl.
*H04B 7/06* (2006.01)
*H04W 12/069* (2021.01)
(Continued)

(52) U.S. Cl.
CPC .......... *H04B 7/0695* (2013.01); *H04B 7/088* (2013.01); *H04W 12/069* (2021.01); *H04W 48/14* (2013.01); *H04W 48/16* (2013.01)

(58) Field of Classification Search
CPC ... H04B 7/0695; H04B 7/088; H04W 12/069; H04W 48/14; H04W 48/16; H04W 84/12; H04W 88/10
See application file for complete search history.

(56) References Cited

U.S. PATENT DOCUMENTS 7,653,163 B2   1/2010   Sadri et al.
7,894,405 B2   2/2011   Zhun
(Continued)

FOREIGN PATENT DOCUMENTS

CN   103596198 A   2/2014
CN   104704885 A   6/2015
(Continued)

OTHER PUBLICATIONS

Aruba, "Aruba Ap-387 Access Point", Data Sheet, Jan. 15, 2019, 5 pages.
(Continued)

*Primary Examiner* — Kenneth T Lam
(74) *Attorney, Agent, or Firm* — Hewlett Packard Enterprise Patent Department

(57) ABSTRACT

Examples described herein provide multi-band directional scanning. Examples may include receiving, by a first radio of a first network device operating at a first frequency band below the millimeter-wave (mmWave), a probe request from a second network device indicating a protocol and a particular sector receiving direction of the second network device, and in response to the protocol indicated by the probe request, transmitting, by a second radio of the first network device operating at a second frequency band within the mmWave, a probe response in each of one or more sector transmitting directions, wherein the second network device receives one or more probe responses in the particular sector receiving direction.

20 Claims, 6 Drawing Sheets

(51) Int. Cl.
    *H04B 7/08*   (2006.01)
    *H04W 48/14*  (2009.01)
    *H04W 48/16*  (2009.01)

(56) References Cited

U.S. PATENT DOCUMENTS

| | | | |
|---|---|---|---|
| 8,503,377 B2 | 8/2013 | Cordeiro et al. | |
| 8,615,564 B2 | 12/2013 | Kim et al. | |
| 9,467,933 B2 | 10/2016 | Park et al. | |
| 9,756,554 B2 | 9/2017 | Jeong et al. | |
| 10,779,196 B2* | 9/2020 | Roy | H04W 36/14 |
| 10,944,463 B2* | 3/2021 | Wee | H04B 7/088 |
| 2010/0074190 A1* | 3/2010 | Cordeiro | H04W 48/16 370/329 |
| 2011/0038357 A1 | 2/2011 | Gong | |
| 2011/0158110 A1* | 6/2011 | Stacey | H04W 36/30 370/252 |
| 2015/0288427 A1 | 10/2015 | Wang et al. | |
| 2016/0044711 A1* | 2/2016 | Lou | H04W 72/21 370/338 |
| 2016/0050614 A1* | 2/2016 | Son | H04L 47/12 455/434 |
| 2016/0119770 A1* | 4/2016 | Ryu | G01S 1/00 370/328 |
| 2016/0380685 A1 | 12/2016 | Kasher et al. | |
| 2017/0086211 A1* | 3/2017 | Sahin | H04W 72/12 |
| 2019/0075607 A1* | 3/2019 | Park | H04W 76/14 |
| 2019/0208464 A1* | 7/2019 | Lee | H04W 84/12 |
| 2019/0222995 A1* | 7/2019 | Abouelseoud | H04W 16/28 |
| 2019/0280749 A1* | 9/2019 | Wee | H04W 16/28 |
| 2020/0029376 A1* | 1/2020 | Asterjadhi | H04W 28/04 |

FOREIGN PATENT DOCUMENTS

| | | |
|---|---|---|
| CN | 107148783 A | 9/2017 |
| CN | 107646170 A | 1/2018 |
| CN | 109121206 A | 1/2019 |

OTHER PUBLICATIONS

Cario et al., "Collaboration Between 2.4/5 and 60 Ghz", (Research Paper), Apr. 30, 2010, 19 Pages.

International Search Report and Written Opinion received for PCT Application No. PCT/CN2019/084070, dated Jan. 23, 2020, 7 pages.

International Search Report and Written Opinion received for PCT Application No. PCT/CN2019/084078, dated Jan. 23, 2020, 7 pages.

* cited by examiner

MULTI-BAND DIRECTIONAL SCANNING

CROSS-REFERENCE TO RELATED APPLICATIONS

This application claims the benefit of PCT Application No. PCT/CN2019/084070, filed on Apr. 24, 2019, which is hereby incorporated herein by reference in its entirety. This application is also related to U.S. application Ser. No. 17/599,706, filed on Sep. 29, 2021, which claims the benefit of PCT Application No. PCT/CN2019/084078, filed on Apr. 24, 2019, which has Invention Reference Number 90731248 and is assigned to Hewlett Packard Enterprise Development LP, which is hereby incorporated herein by reference in its entirety.

BACKGROUND

In recent years, millimeter-wave (mmWave) network devices have attracted a great deal of attention from industry. As used herein, the term "mmWave" refers to the radio frequency (RF) spectrum between 10 GHz and 300 GHz. A mmWave network device may transmit and/or receive signals at mmWave bands to establish wireless communication links between nodes of a network.

MmWave bands may provide at least the following advantages over frequency bands below 10 GHz. First, mmWave bands may offer wider channel bandwidths as compared to frequency bands below 10 GHz. For instance, whereas the IEEE 802.11ad standard for the 60 GHz band provides channel bandwidths of 2.16 GHz, the IEEE 802.11 ac standard for the 5 GHz band only provides channel bandwidths of up to 160 MHz. Second, whereas channels for frequency bands below 10 GHz (e.g., 2.4 GHz, 5 GHz) are becoming increasingly congested by Fourth Generation Long Term Evolution (4G LTE) and Wi-Fi networks, some mmWave bands are unlicensed and freely available for use. For instance, in some jurisdictions, the 60 GHz band offers 7 GHz of continuous, unlicensed spectrum.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
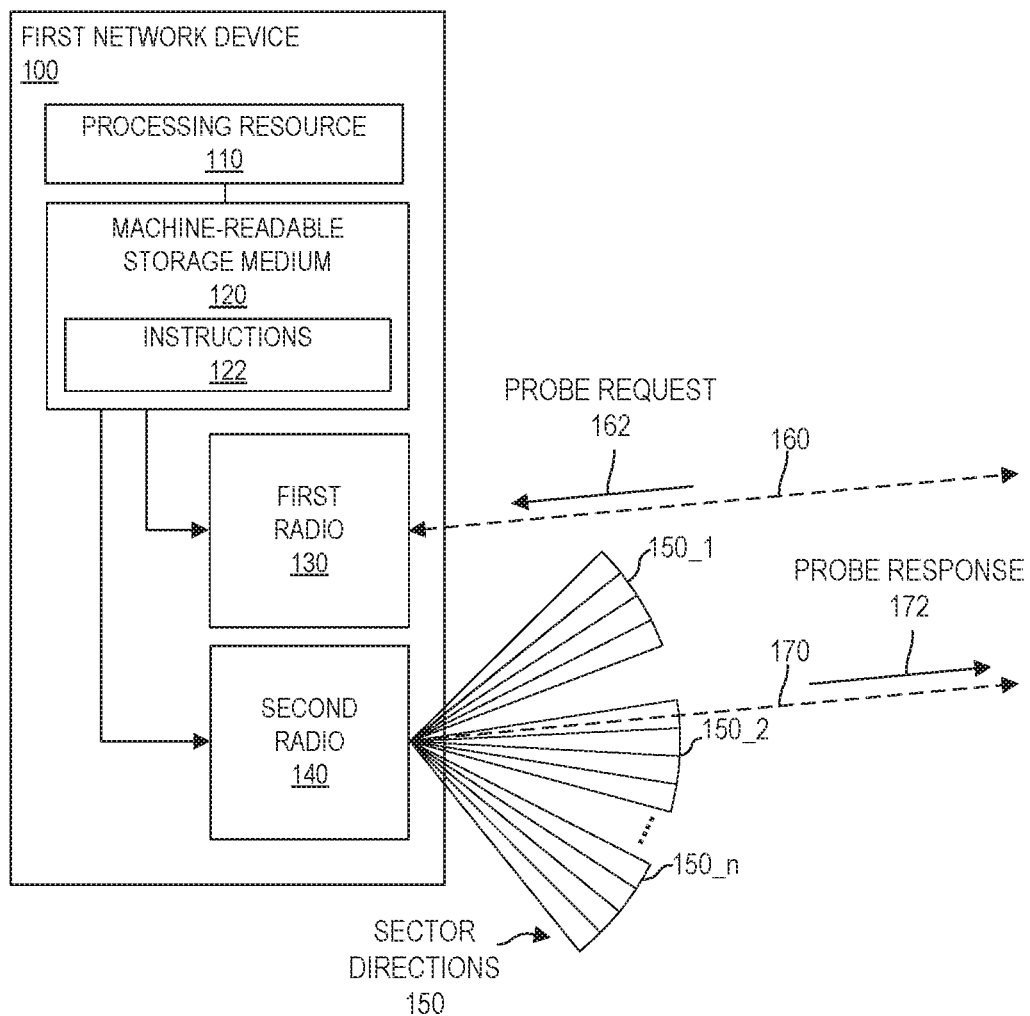
FIG. 1 is a block diagram of an example network device for multi-band directional scanning.

As noted above, mmWave network devices may transmit and/or receive mmWave signals to establish wireless communication links between nodes of a network. In some examples, mmWave network devices may provide backhaul connectivity between networks. In examples described herein, a "backhaul" refers to communication links between nodes of one or more networks and a backbone network (i.e., core network). In such examples, a first mmWave network device may operate as a root node (i.e., gateway node) which is connected to a backbone network via a wired and/or wireless communication link, and a second mmWave network device may operate as a remote node which is connected to the first mmWave network device via a wireless communication link. In such examples, the first and second mmWave network devices may establish wireless communication links with other nodes of one or more networks to provide backhaul connectivity to the backbone network.

It may be advantageous to use mmWave network devices to provide backhaul connectivity between networks, for at least the following reasons. First, as noted above, since mmWave signals may provide increased bandwidths as compared to signals below 10 GHz, mmWave network devices may offer greater throughput as compared to network devices which can only operate at frequency bands below 10 GHz. Second, as noted above, since some mmWave bands are unlicensed and freely available to use, using mmWave network devices to provide backhaul connectivity between networks may be less expensive as compared to using leased lines or wireless connections at licensed frequency bands below 10 GHz.

Despite the great potential that mmWave network devices offer for providing backhaul connectivity between networks, mmWave signals may be more susceptible to propagation loss than signals below 10 GHz. For instance, because mmWave signals have shorter wavelengths (i.e., higher frequency) as compared to signals below 10 GHz, mmWave signals may experience greater propagation loss due to line-of-sight (LOS) obstructions, atmospheric attenuation, and weather conditions (e.g., humidity, rain, etc.) To mitigate the effects of propagation loss, mmWave network devices may increase gain by transmitting and receiving directional mmWave signals having narrower beamwidths. However, as explained herein, passive directional scanning requires a first mmWave network device to transmit, via a frequency band within the mmWave range, a beacon frame for each available sector scanning direction of a second mmWave network device to establish a wireless communication link between the first and second mmWave network devices. As explained herein, such passive directional scanning may result in long scan times when there are a plurality of available sector transmitting and sector scanning directions between the first and second mmWave network devices.

To address these issues, examples described herein may receive, by a first radio of a first network device operating at a first frequency band below the mmWave, a probe request from a second network device indicating a protocol and a particular sector scanning direction of the second network device. Examples described herein may, in response to the protocol indicated by the probe request, transmit, by a second radio of the first network device operating at a second frequency band within the mmWave, a probe response in each of one or more sector transmitting directions, wherein the second network device receives one or more probe responses in the particular sector scanning direction.

In this manner, examples described herein may provide multi-band directional scanning between network devices. For instance, in such examples, the first network device may receive the probe request indicating the sector scanning direction of the second network device via the first frequency band below the mmWave, thereby avoiding requiring the first network device to send, via a frequency band within the mmWave, a beacon frame for every sector scanning direction of the second network device. In addition, in such examples, the first network device may, in response to the protocol indicated by the probe request, transmit the probe response in each of one or more sector transmitting directions via the second frequency band within the mmWave, thereby allowing one or more probe responses to be received by the second network device in the particular sector scanning direction, rather than requiring probe responses to be received by the second network device in every sector scanning direction. Thus, examples described may provide may reduce scan times for establishing wireless communication links between network devices.

Referring now to the drawings, FIG. 1 is a block diagram of an example network device 100 for multi-band directional scanning. In the example of FIG. 1, network device 100 (which may be referred to herein as "first" network device 100) includes at least one processing resource 110 and at least one machine-readable medium 120 comprising (e.g., encoded with) at least instructions 122 that are executable by the at least one processing resource 110 of network device 100 to implement functionalities described herein in relation to instructions 122.

In the example of FIG. 1, network device 100 may engage in any network data transmission operations, including, but not limited to, switching, routing, bridging, or a combination thereof. In some examples, network device 100 may comprise a wireless access point (WAP). In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network device 100 may be any suitable type(s) of network devices made by any suitable manufacturer(s).

In the example of FIG. 1, network device 100 includes a first radio 130 and a second radio 140. In some examples, first radio 130 may operate at a first frequency band below the mmWave (i.e., a frequency band below 10 GHz.) In some examples, first radio 130 may operate at a frequency band within the range of 400 MHz to 7 GHz. For example, first radio 130 may operate at a 5 GHz band which conforms to the IEEE 802.11 ac standard, a 2.4 GHz band which conforms to one or more of the IEEE 802.11ac, 802.11n, and 802.11g standards, or a combination thereof. It will be understood by one skilled in the art that first radio 130 may transmit and receive wireless signals that conform to any suitable type(s) of wireless communications standard(s), now known or later developed, and/or operate at any suitable frequency range(s). In some examples, first radio 130 may comprise an antenna which transmits directional and/or omnidirectional signals. In examples described herein, a "directional" signal refers to a signal which radiates more strongly in one or more directions as compared to one or more other directions along an azimuth plane (i.e., horizontal plane), whereas an "omnidirectional" signal refers to a signal which radiates equally in all directions along an azimuth plane. In some examples, first radio 130 may comprise a phased array antenna. In examples described herein, a "phased array antenna" refers to an array of antennas which can create a directional signal which can be electronically steered to point in different directions without moving the antennas. In some examples, the phased array antenna may comprise an array of directional and/or omnidirectional antennas which can focus RF energy towards specific spatial directions.

In the example of FIG. 1, second radio 140 may operate at a second frequency band within the mmWave. In some examples, second radio 140 may operate at a frequency band within the range of 24 to 300 GHz. For example, second radio 140 may operate at a 60 GHz band which conforms to one or both of the IEEE 802.11ad and 802.11ay standards. It will be understood by one skilled in the art that second radio 140 may transmit and receive wireless signals that conform to any suitable type(s) of wireless communications standard(s), now known or later developed, and/or operate at any suitable frequency range(s). In some examples, second radio 140 may comprise an antenna which transmits and receives directional signals. In some examples, second radio 140 may comprise a phased array antenna. In some examples, second radio 140 may transmit and receive directional signals in one or more of a plurality of sector directions 150_1 to 150_$n$ (collectively referred to as sector directions 150), wherein n is an integer greater than one. For example, second radio 140 may transmit and receive directional signals in 32 sector directions (i.e., 150_1 to 150_32.) In some examples, each one of sector directions 150 may correspond to a plurality of beam directions. For example, as shown in FIG. 1, each one of sector directions 150 may correspond to four beam directions. It will be understood by one skilled in the art that second radio 140 may provide any suitable number(s) of sector directions 150 and beam directions. Moreover, although FIG. 1 shows that network device 100 comprises two radios, it will be understood by one skilled in the art that network device 100 may comprise four, eight, or any suitable number of radios.

In the example of FIG. 1, first radio 130 may establish a wireless communication link 160 with a second network device, and second radio 140 may establish a wireless communication link 170 with the second network device. In some examples, wireless communication links 160 and 170 may use any suitable data transmission protocol(s), including at least one connection-oriented protocol such as Transmission Control Protocol (TCP), at least one connectionless protocol such as User Datagram Protocol (UDP), or the like, or a combination thereof. It will be understood by one skilled in the art that each of wireless communication links 160 and 170 may use any suitable type(s) of data transmission protocol(s), now known or later developed.

In the example of FIG. 1, instructions 122 may be configured to receive, by first radio 130, a probe request 162 from a second network device indicating a protocol and particular sector scanning direction of a second network device. In some examples, probe request 162 may comprise an Ethernet frame having a frame format which conforms to the IEEE 802.3 standards. In some examples, probe request 162 may comprise a data packet comprising a header and a payload. In examples described herein, a header may comprise control information for delivering the payload, such as source and destination information, sequencing information, service information, flagging information, other transmission-related information, or the like, or a combination thereof. In examples described herein, a payload may comprise data which is carried by the data packet. In some examples, probe request 162 may comprise a field indicating the specific protocol. In some examples, the specific protocol may instruct first network device 100 to transmit a probe response via second radio 140. In some examples, probe request 162 may comprise a field comprising a value indicating the particular sector scanning direction of a second network device. In some examples, probe request 162 may indicate a particular scanning channel of the second frequency band. In some examples, probe request 162 may indicate a particular scanning duration of the second network device. In some examples, probe request 162 may indicate a particular sector transmitting direction of network device 100. It will be understood by one skilled in the art that probe request 162 may have any suitable format(s) and any suitable type(s) of field(s), now known or later developed.

In the example of FIG. 1, instructions 122 may be configured to, based on (e.g., in response to) the protocol indicated by probe request 162, transmit, by second radio 140, a probe response 172 in each of one or more sector transmitting directions, wherein the second network device receives one or more probe responses 172 in the particular sector scanning direction. In some examples, one or more sector transmitting directions may correspond to sector directions 150_1 to 150_n. For example, when n is equal to 32, instructions 122 may be configured to transmit, by second radio 140, probe response 172 in each of 32 sector directions (i.e., 150_1 to 150_32.) In some examples, probe response 172 may comprise a management frame having a frame format which conforms to the IEEE 802.11 standards. In some examples, probe response 172 may comprise a data packet comprising a header and a payload. In some examples, probe response 172 may indicate one or more Basic Service Set Identifiers (BSSIDs), one or more Service Set Identifiers (SSIDs), one or more Extended Service Set Identifiers (ESSIDs), or a combination thereof. It will be understood by one skilled in the art that probe response 172 may have any suitable format(s) and any suitable type(s) of field(s), now known or later developed.

In the example of FIG. 1, instructions 122 may be configured to receive, by second radio 140, an authentication request from the second network device, wherein the authentication request is based on (e.g., in response to) one or more probe responses 172 received by the second network device in the particular sector scanning direction. In the example of FIG. 1, instructions 122 may be configured to, based on (e.g., in response to) the authentication request, transmit, by second radio 140, an authentication response to the second network device. In some examples, instructions 122 may be configured to receive the authentication request and/or transmit the authentication response in a particular sector direction corresponding to a particular one of sector directions 150. In some examples, instructions 122 may be configured to receive the authentication request and/or transmit the authentication response in a particular sector direction corresponding to a particular sector transmitting direction indicated by probe request 162. In some examples, instructions 122 may be configured to receive the authentication request and/or transmit the authentication response in a particular beam direction corresponding to a particular one of sector directions 150. In some examples, the authentication request may comprise a field indicating an authentication algorithm number. In some examples, the authentication algorithm number may indicate an open-system authentication or a shared-key authentication. In some examples, instructions 122 may be configured to transmit the authentication response based on (e.g., in response to) an open-system authentication or a shared-key authentication of the authentication request. In some examples, each of the authentication request and the authentication response may comprise a management frame having a frame format which conforms to the IEEE 802.11 standards. In some examples, each of the authentication request and the authentication response may comprise a data packet comprising a header and a payload. It will be understood by one skilled in the art that each of the authentication request and the authentication response may have any suitable format(s) and any suitable type(s) of field(s), now known or later developed.

In the example of FIG. 1, instructions 122 may be configured to receive, by second radio 140, an association request from the second network device, wherein the association request is based on (e.g., in response to) one or more probe responses 172 received by the second network device in the particular sector scanning direction. In the example of FIG. 1, instructions 122 may be configured to, based on (e.g., in response to) the association request, transmit, by second radio 140, an association response to the second network device to establish a connection with the second network device. In some examples, instructions 122 may be configured to receive the association request and/or transmit the association response in a particular sector direction corresponding to a particular one of sector directions 150. In some examples, instructions 122 may be configured to receive the association request and/or transmit the association response in a particular sector direction corresponding to a particular sector transmitting direction indicated by probe request 162. In some examples, instructions 122 may be configured to receive the association request and/or transmit the association response in a particular beam direction corresponding to a particular one of sector directions 150. In some examples, each of the association request and the association response may comprise a management frame having a frame format which conforms to the IEEE 802.11 standards. In some examples, each of the association request and the association response may comprise a data packet comprising a header and a payload. It will be understood by one skilled in the art that each of the association request and the association response may have any suitable format(s) and any suitable type(s) of field(s), now known or later developed.

In the example of FIG. 1, instructions 122 may be configured to, based on (e.g., in response to) an established connection with the second network device, transmit, by second radio 140, a data frame to the second network device. In the example of FIG. 1, instructions 122 may be configured to, based on (e.g., in response to) an established connection with the second network device, receive, by the second radio, a data frame from the second network device. In some examples, instructions 122 may be configured to transmit and/or receive a data frame in a particular sector direction corresponding to a particular one of sector directions 150. In some examples, instructions 122 may be configured to transmit and/or receive a data frame in a particular sector direction corresponding to the particular sector transmitting direction indicated by probe request 162. In some examples, instructions 122 may be configured to transmit and/receive a data frame in a particular beam direction corresponding to a particular one of sector directions 150. In some examples, a data frame may comprise a frame format which conforms to the IEEE 802.11 standards. It will be understood by one skilled in the art that the data frame may have any suitable format(s) and any suitable type(s) of field(s), now known or later developed.

Next, a duration of multi-band directional scanning according to the present invention will be explained in relation to the example of FIG. 1. In the example of FIG. 1, a duration of multi-band directional scanning may be equal to (time of probe request 162+time of probe response 172)×(number of sector transmitting directions). Moreover, the duration of multi-band directional scanning may include time for re-transmission of probe request 162 and/or probe response 172 due to channel contention. For example, provided that (time of probe request 162|probe response 172|time for re-transmission) is approximately 2 ms, when network device 100 has 32 sector transmitting directions, the duration of multi-band directional scanning may be approximately equal to 2 ms×(32 sector transmitting directions), or approximately 64 ms. Moreover, in such example, when the second network device has 32 sector scanning directions, the duration of multi-band directional scanning for each available sector scanning direction of the second network device may be approximately equal to 64 ms×(32 sector scanning directions), or approximately 2 seconds. Moreover, in such example, provided that second radio 140 has three available channels corresponding to the second frequency band within the mmWave, the duration of multi-band directional scanning for all three channels may be approximately equal to 2 seconds×(3 channels for the second frequency band), or approximately six seconds.

For comparison, a duration of passive directional scanning (i.e., directional scanning without performing the method of the invention described herein) will be described in relation to the example of FIG. 1. In the example of FIG. 1, passive directional scanning requires network device 100 to transmit, via second radio 140 operating at the second frequency band within the mmWave, a beacon frame for each of a plurality of sector scanning directions of the second network device in each of the plurality of sector directions 150. Thus, the duration of passive directional scanning may be equal to (beacon interval of the beacon frame)×(number of sector transmitting directions)×(number of sector scanning directions). For example, provided that the beacon interval is approximately 100 ms, when network device 100 has 32 sector transmitting directions, and when the second network device has 32 available sector scanning directions, the duration of passive directional scanning for a given channel within the second frequency band may be approximately equal to 100 ms×(32 sector scanning directions)×(32 sector transmitting directions), or approximately 102.4 seconds. Moreover, in such example, provided that second radio 140 has three available channels corresponding to the second frequency band, the duration of passive directional scanning for all three channels for the second frequency band may be approximately equal to 102.4 seconds×(3 channels for the second frequency band), or approximately five minutes.

In this manner, the example network device 100 of FIG. 1 may provide multi-band directional scanning. For instance, instructions 122 may be configured to receive, by first radio 130 operating at the first frequency band below the mmWave, probe request 162 from the second network device indicating the protocol and the particular sector scanning direction of the second network device, thereby avoiding requiring network device 100 to send, via the second frequency band within the mmWave, a beacon frame for every sector scanning direction of the second network device. Moreover, instructions 122 may be configured to, in response to the protocol indicated by probe request 162, transmit, by second radio 140 operating at the second frequency band within the mmWave, probe response 172 in each of one or more sector directions 150, wherein the second network device receives one or more probe responses 172 in the particular sector scanning direction, thereby allowing one or more probe responses 172 to be received by the second network device in the particular sector scanning direction, rather than requiring one or more probe responses 172 to be received in every sector scanning direction of the second network device. Thus, examples described herein may provide may reduce scan times for establishing wireless communication links between network devices as compared to passive directional scanning.

Figure 2:
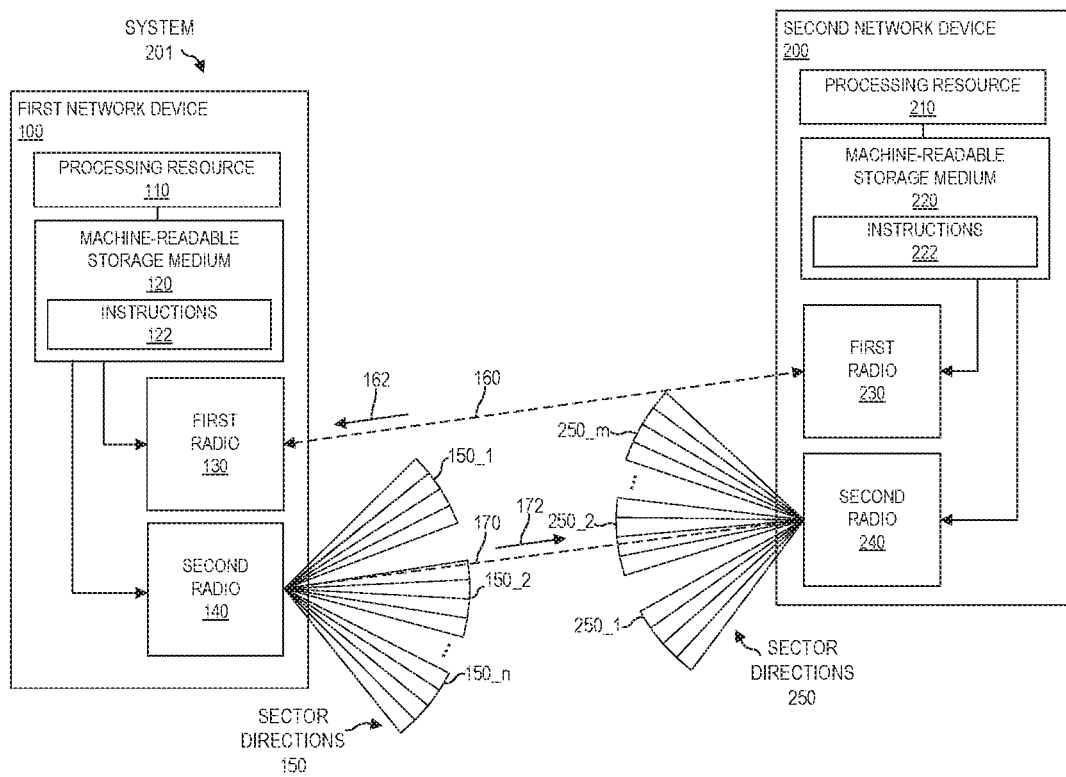
FIG. 2 is a block diagram of an example system including first network device and second network device for multi-band directional scanning.

FIG. 2 is a block diagram of an example system 201 for multi-band directional scanning. In the example of FIG. 2, system 201 may include first network device 100, as described above in relation to FIG. 1. System 201 may include a second network device 200.

In the example of FIG. 2, second network device 200 includes at least one processing resource 210 and at least one machine-readable medium 220 comprising (e.g., encoded with) at least instructions 222 that are executable by the at least one processing resource 210 of second network device 200 to implement functionalities described herein in relation to instructions 222. In some examples, one or more instructions 222 may be the same as or similar to one or more instructions 122, as described above.

In the example of FIG. 2, second network device 200 may engage in any network data transmission operations, including, but not limited to, switching, routing, bridging, or a combination thereof. In some examples, second network device 200 may comprise a WAP. It will be understood by one of ordinary skill in the art that second network device 200 may be any suitable type(s) of network devices made by any suitable manufacturer(s).

In the example of FIG. 2, second network device 200 includes a first radio 230 and a second radio 240. In some examples, first radio 230 may operate at the same frequency band as first radio 130 of first network device 100. In some examples, first radio 230 may operate at a first frequency band below the mmWave (i.e., a frequency band below 10 GHz.) In some examples, first radio 230 may operate at a frequency band within the range of 400 MHz to 7 GHz. For example, first radio 230 may operate at a 5 GHz band which conforms to the IEEE 802.11ac standard, a 2.4 GHz band which conforms to one or more of the IEEE 802.11ac, 802.11n, and 802.11g standards, or a combination thereof. It will be understood by one skilled in the art that first radio 230 may transmit and receive wireless signals that conform to any suitable type(s) of wireless communications standard(s), now known or later developed, and/or operate at any suitable frequency range(s). In some examples, first radio 230 may comprise an antenna which transmits directional and/or omnidirectional signals. In some examples, first radio 230 may comprise a phased array antenna.

In the example of FIG. 2, second radio 240 may operate at a second frequency band within the mmWave. In some examples, second radio 240 may operate at the same frequency band as second radio 140 of first network device 100. In some examples, second radio 240 may operate at a frequency band within the range of 24 to 300 GHz. For example, second radio 140 may operate at a 60 GHz band which conforms to one or both of the IEEE 802.11ad and 802.11 ay standards. It will be understood by one skilled in the art that second radio 240 may transmit and receive wireless signals that conform to any suitable type(s) of wireless communications standard(s), now known or later developed, and/or operate at any suitable frequency range (s). In some examples, second radio 240 may comprise an antenna which transmits and receives directional signals. In some examples, second radio 240 may comprise a phased array antenna. In some examples, second radio 240 may transmit and receive directional signals in one or more of a plurality of sector directions 250_1 to 250_m (collectively referred to as sector directions 250), wherein m is an integer greater than one. In some examples, the number m of sector directions 250 may be the same as the number n of sector directions 150 of second radio 140 of first network device 100. For example, second radio 240 may transmit and receive directional signals in 32 sector directions (i.e., 250_1 to 250_32.) In some examples, each of the sector directions 250 may correspond to a plurality of beam directions. In some examples, each of sector directions 250 may each have the same number of beam directions as sector directions 150 of second radio 140 of first network device 100. For example, as shown in FIG. 2, each of the sector directions 250 may correspond to four beam directions. It will be understood by one skilled in the art that second radio 240 may provide any suitable number(s) of sector directions 250 and beam directions. Moreover, although FIG. 2 shows that second network device 200 comprises two radios, it will be understood by one skilled in the art that second network device 200 may comprise, four, eight, or any suitable number of radios, and that second network device 200 may have a same number or a different number of radios as first network device 100.

In the example of FIG. 2, first radio 130 of first network device 100 may establish wireless communication link 160 with first radio 230 of second network device 200. In the example of FIG. 2, second radio 140 of first network device 100 may establish wireless communication link 170 with second radio 240 of second network device 200.

In the example of FIG. 2, instructions 222 may be configured to transmit, by first radio 230, probe request 162 indicating the protocol and the particular sector scanning direction. In some examples, instructions 222 may be configured to transmit probe request 162 to first radio 130 of first network device 100. In some examples, the particular sector scanning direction may correspond to a particular one of sector directions 250.

In the example of FIG. 2, instructions 222 may be configured to receive, by second radio 140, one or more probe responses 172 in the particular sector scanning direction.

In the example of FIG. 2, instructions 222 may be configured to, based on (e.g., in response to) one or more probe responses 172 received in the particular sector scanning direction, transmit, by second radio 240, the authentication request to first network device 100. In the example of FIG. 2, instructions 222 may be configured to receive, by second radio 240, the authentication response in a particular sector direction. In some examples, instructions 222 may be configured to transmit the authentication request and/or receive the authentication response in a particular sector direction corresponding to the particular one of sector directions 250. In some examples, instructions 222 may be configured to transmit the authentication request and/or receive the authentication response in the particular sector scanning direction indicated by probe request 162. In some examples, instructions 222 may be configured to transmit the authentication request and/or receive the authentication response in a beam direction corresponding to a particular one of sector directions 250.

In the example of FIG. 2, instructions 222 may be configured to, based on (e.g., in response to) one or more probe responses 172 received in the particular sector scanning direction, transmit, by second radio 240, the association request to first network device 100. In the example of FIG. 2, instructions 222 may be configured to receive, by second radio 240, the association response in a particular sector direction to establish a connection with the first network device. In some examples, instructions 222 may be configured to transmit the association request and/or receive the association response in a particular sector direction corresponding to the particular one of sector directions 250. In some examples, instructions 222 may be configured to transmit the association request and/or receive the association response in the particular sector scanning direction indicated by probe request 162. In some examples, instructions 222 may be configured to transmit the association request and/or receive the association response in a beam direction corresponding to a particular one of sector directions 250.

In the example of FIG. 2, instructions 222 may be configured to, based on (e.g., in response to) an established connection with first network device 100, receive, by second radio 240, a data frame from first network device 100. In the example of FIG. 2, instructions 222 may be configured to, based on (e.g., in response to) an established connection with first network device 100, transmit, by second radio 240, a data frame to first network device 100. In some examples, instructions 222 may be configured to receive and/or transmit a data frame in a particular sector direction corresponding to a particular one of sector directions 250. In some examples, instructions 222 may be configured to receive and/or transmit a data frame in a particular sector direction corresponding to the particular sector scanning direction indicated by probe request 162. In some examples, instructions 22 may be configured to receive and/transmit a data frame in a particular beam direction corresponding to a particular one of sector directions 250.

In this manner, the example system 201 of FIG. 2 may provide multi-band directional scanning. For instance, instructions 222 may be configured to transmit, by first radio 230, probe request 162 indicating the protocol and the particular sector scanning direction, thereby avoiding requiring second network device 200 to send, via a frequency band within the mmWave, a beacon frame for every sector scanning direction (e.g., sector directions 250) Moreover, instructions 222 may be configured to receive, by second radio 140, one or more probe responses 172 in the particular sector scanning direction, thereby allowing second network device 200 to receive one or more probe responses 172 in the particular sector scanning direction, rather than requiring one or more probe responses 172 to be received in every sector scanning direction (e.g., sector directions 250.) Thus, examples described herein may provide may reduce scan times as compared to passive directional scanning.

Figure 3:
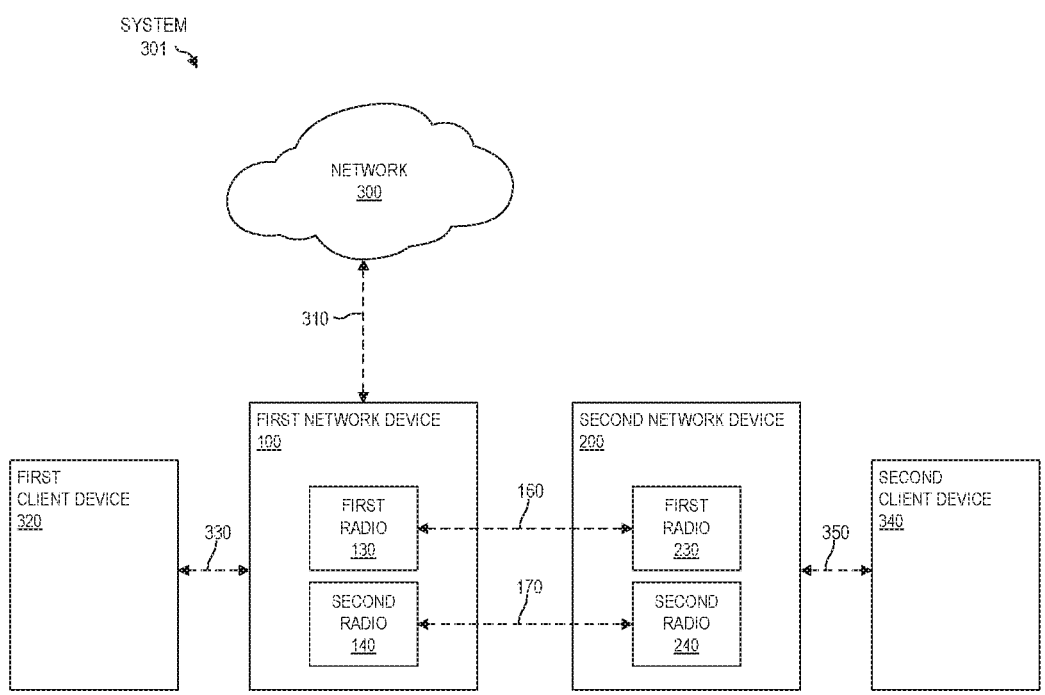
FIG. 3 is a block diagram of an example system including first network device and second network device for multi-band directional scanning.

FIG. 3 is a block diagram of an example system 301 for multi-band directional scanning. In the example of FIG. 3, system 301 may include first network device 100 and second network device 200, as described above in relation to FIGS. 1 and 2. In the example of FIG. 3, system 301 may include a network 300, first client device 320, and second client device 340. In some examples, functionalities described herein in relation to FIG. 3 may be provided in combination with functionalities described herein in relation to any of FIGS. 1-2 and 4-5.

In the example of FIG. 3, network 300 may comprise a computer network. In some examples, network 300 may comprise one or more local area networks (LANs), virtual LANs (VLANs), wireless local area networks (WLANs), virtual private networks (VPNs), wide area networks (WANs), the Internet, or the like, or a combination thereof. In examples described herein, a WAN may comprise, for example, a wired WAN, wireless WAN, hybrid WAN, software-defined WAN (SD-WAN), or the like, or a combination thereof. In the example of FIG. 3, network 300 may comprise a cellular network. In the example of FIG. 3, network 300 may comprise a combination of one or more computer networks and one or more cellular networks. In some examples, network 300 may comprise a backbone network. It will be understood by one skilled in the art that network 300 may comprise any suitable type(s) of network(s), now known or later developed. Moreover, although FIG. 3 shows that network 300 may be connected to first network device 100, it will be understood by one skilled in the art that network 300 may also be connected to second network device 200.

In the example of FIG. 3, each of first client device 320 and second client device 340 may comprise a processor, memory, and input/output interfaces for wired and/or wireless communication. In some examples, one or both of first client device 320 and second client device 340 may comprise a laptop computer, a desktop computer, a mobile device, and/or other wireless devices, although examples of the disclosure are not limited to such devices. In examples described herein, a mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices. In some examples, one or both of first client device 320 and second client device 340 may comprise a network device which may engage in any network data transmission operations, including, but not limited to, switching, routing, bridging, or a combination thereof. In some examples, one or both of first client device 320 and second client device 340 may comprise a WAP. Although FIG. 3 shows that system 301 comprises two client devices will be understood by one skilled in the art that system 301 may comprise any suitable number of client devices.

In the example of FIG. 3, communication links 310, 330, and 350 allow communication between devices of system 310. In the example of FIG. 3, communication link 310 allows communication between first network device 100 and network 300, communication link 330 allows communication between first network device 100 and first client device 320, and communication link 350 allows communication between second network device 200 and second client device 340. In some examples, communication link 310 may be established via first radio 130 and/or second radio 140 of first network device 100, via first radio 230 and/or second radio 240 of second network device 200, or a combination thereof. In some examples, communication link 330 may be established via first radio 130 and/or second radio 140 of first network device 100. In some examples, communication link 350 may be established via first radio 230 and/or second radio 240 of second network device 200. In some examples, each of communication links 310, 330, and 350 may comprise a wired link, such as a wire, a cable, an optical fiber, or the like, or a combination thereof, a wireless link, such as a Wi-Fi link, a cellular link, or the like, or a combination thereof, or a combination of at least one wired link and at least one wireless link. It will be understood by one skilled in the art that communication link 310 may use any suitable type(s) of wired and/or wireless link(s), now known or later developed. In some examples, each of communication links 310, 330, and 350 any suitable data transmission protocol(s), including at least one connection-oriented protocol such as TCP, at least one connectionless protocol such as UDP, or the like, or a combination thereof. It will be understood by one skilled in the art that communication links 310, 330, and 350 may use any suitable type(s) of data transmission protocol(s), now known or later developed.

In the example of FIG. 3, first network device 100 and second network device 200 may provide backhaul connectivity to network 300. For example, first network device 100 may operate as a root node which is connected to network 300 via a wired communication link 310, and second network device 200 may operate as a remote node which is connected to first network device 100 via a wireless communication link (e.g., via one or both communication links 160, 170). In such example, first network device 100 may establish a wireless communication link 330 with first client device 320, and second network device 200 may establish a wireless communication link 350 with second client device 340, thereby providing backhaul connectivity to first client device 320 and second client device 340 to network 300.

Figure 4A:
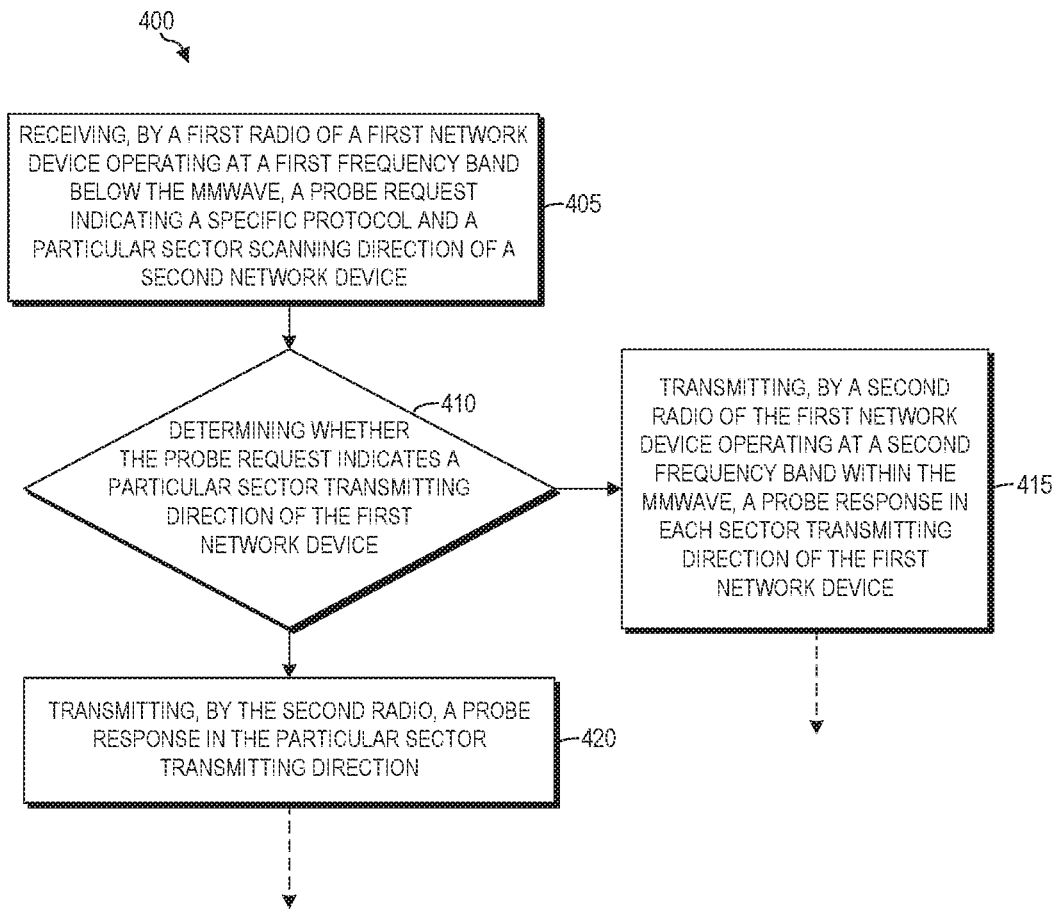
FIGS. 4A and 4B show a flowchart of an example process for multi-band directional scanning.
Figure 4B:
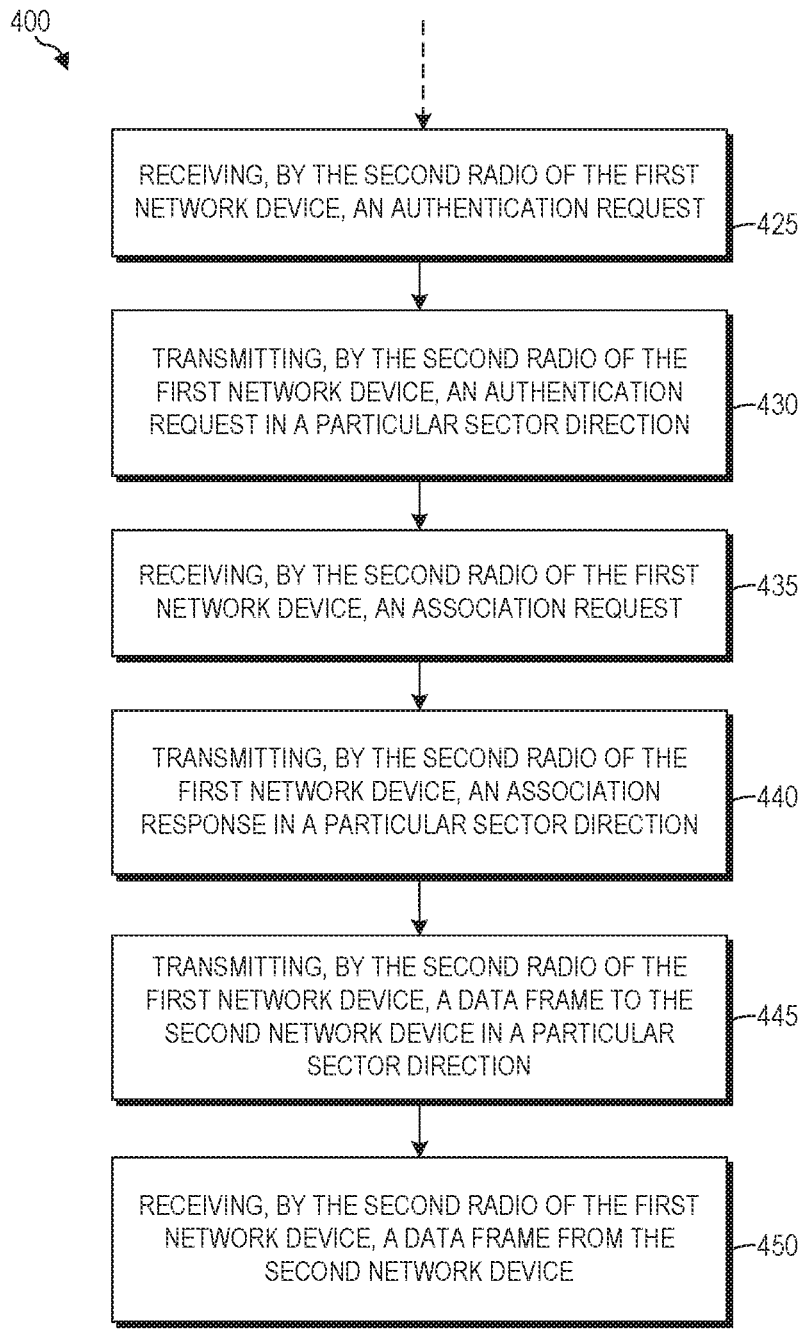

FIGS. 4A and 4B show functionality 400 for a network device, according to one example. Functionality 400 may be implemented as a method or may be executed as one or more instructions on a machine (e.g., by at least one processor), where the one or more instructions are included on at least one machine-readable storage medium (e.g., a non-transitory machine readable-storage medium.) While only ten blocks are shown in functionality 400, functionality 400 may include other actions described herein. Additionally, although the blocks are shown in an order, blocks depicted in FIGS. 4A and 4B may be performed in any order and at any time. Also, some of the blocks shown in functionality 400 may be omitted without departing from the spirit and scope of this disclosure. Functionality 400 may be implemented on a network device according to any of the examples herein.

As shown in block 405, functionality 400 may include receiving, by a first radio of a first network device operating a first frequency band below the mmWave, a probe request indicating a specific protocol and a particular sector scanning direction of a second network device.

In some examples, the probe request may be received from a second network device. In addition, the probe request may be received from a first radio of the second network device operating at the first frequency band below the mmWave.

In some examples, the probe request may indicate a particular channel scanning direction of the second network device. In some examples, the probe request may indicate a particular scanning duration of the second network device. In some examples, the probe request may indicate a particular sector transmitting direction of the first network device.

In examples described herein, the particular sector transmitting and/or receiving direction of the first network device, as indicated by the probe request, may be based on determining a quality of one or more signals transmitted by the first network device in one or more sector transmitting directions and received by the second network device.

In examples described herein, the quality of one or more signals received by the second network device may be determined based on measuring, by the second network device, a received signal strength indicator (RSSI) of the one or more received signals. For example, the signal having the highest RSSI among the one or one or more received signals may be determined to have the highest quality. It will be understood that any suitable methods(s) and/or measurement(s) may be used for determining the quality of one or more signals received by the second network device.

As shown in block 410, functionality 400 may include determining whether the probe request indicates a particular sector transmitting direction of the first network device.

If it is determined that the probe request indicates a particular sector transmitting direction of the first network device, then functionality 400 proceeds to block 420. If it is determined the probe request does not indicate a particular sector transmitting direction of the first network device, then functionality 400 proceeds to block 415.

As shown in block 415, functionality 400 may include transmitting, by a second radio of the first network device operating at a second frequency band within the mmWave, a probe response in each sector transmitting direction of the first network device. The probe response may be transmitted based on (e.g., in response to) the probe request received by the first radio of the first network device. In some examples, the probe response may be transmitted based on (e.g., in response to) the specific protocol indicated by the probe request. In some examples, the probe response may be transmitted to the second network device. In addition, the probe response may be transmitted to a second radio of the second network device operating at the second frequency band within the mmWave.

As shown in block 420, functionality 400 may include transmitting, by the second radio of the first network device, a probe response in the particular sector transmitting direction. The probe response may be transmitted based on (e.g., in response to) the particular sector transmitting direction indicated by the probe request. In some examples, the probe response may be transmitted to the second network device. In addition, the probe response may be transmitted to a second radio of the second network device.

As shown in block 425, functionality 400 may include receiving, by the second radio of the first network device, an authentication request. In some examples, the authentication request may be received from the second network device. In addition, the authentication request may be received from the second radio of the second network device.

The authentication request may be received in a particular sector receiving direction of the first network device. The particular sector receiving direction of the first network device may correspond to a particular sector transmitting direction of the first network device. In addition, the sector transmitting direction of the first network device may correspond to the particular sector transmitting direction indicated by the probe response. In some examples, the authentication request may be received in a particular beam receiving direction of the first network device corresponding to the sector transmitting direction.

In examples described herein, the particular sector transmitting and/or receiving direction of the first network device, as indicated by the probe response, may be based on determining a quality of one or more signals transmitted by the first network device in one or more sector transmitting directions and received by the second network device in the particular sector scanning direction.

As shown in block 430, functionality 400 may include transmitting, by the second radio of the first network device, an authentication response in a particular sector transmitting direction. The authentication response may transmitted based on (e.g., in response to) authenticating the authentication request. In some examples, the authentication request may be authenticated based on open-system authentication or shared-key authentication.

In some examples, the authentication response may be transmitted to the second network device. In addition, the authentication response may be transmitted to the second radio of the second network device. The authentication response may be transmitted in a sector transmitting direction corresponding to a particular sector transmitting direction indicated by the probe request. In some examples, the authentication response may be transmitted in a particular beam transmitting direction corresponding to a particular sector transmitting direction of the first network device.

As shown in block 435, functionality 400 may include receiving, by the second radio of the first network device, an association request. The association request may be based on (e.g., in response to) an authentication response. In some examples, the association request may be received from the second network device. In addition, the association request may be received from the second radio of the second network device. The association request may be received in a particular sector receiving direction of the first network device. The particular sector receiving direction of the first network device may correspond to a particular sector transmitting direction of the first network device. In addition, the sector transmitting direction of the first network device may correspond to a particular sector transmitting direction indicated by the probe request. In some examples, the association request may be received in a particular beam receiving direction of the first network device corresponding to a particular sector transmitting direction of the first network device.

As shown in block 440, functionality 400 may include transmitting, by the second radio of the first network device, an association response in a particular sector transmitting direction. The association response may be transmitted based on (e.g., in response to) associating the second radio of the second network device. In some examples, the association response may establish a connection between the first network device and the second network device. The association response may be transmitted in a sector transmitting direction corresponding to a particular sector transmitting direction indicated by the probe request. In some examples, the association response may be transmitted in a particular beam transmitting direction corresponding to a particular sector transmitting direction of the first network device.

As shown in block 445, functionality 400 may include transmitting, by the second radio of the first network device, a data frame to the second network device in a particular sector transmitting direction. The data frame may be transmitted to the second network device based on (e.g., in response to) an established connection between the first network device and the second network device. In some examples, the data frame may be transmitted to the second radio of the second network device. The data frame may be transmitted in a sector transmitting direction corresponding to a particular sector transmitting direction indicated by the probe request. In some examples, the data frame may be transmitted in a particular beam transmitting direction corresponding to a particular sector transmitting direction of the first network device.

As shown in block 450, functionality 400 may include receiving, by the second radio of the first network device, a data frame from the second network device. The data frame may be received from the second network device based on (e.g., in response to) an established connection between the first network device and the second network device. In some examples, the data frame may be received from the second radio of the second network device. The data frame may be received in a particular sector receiving direction of the first network device. In addition, the particular sector receiving direction may correspond to a particular sector transmitting direction indicated by the probe request. In some examples, the data frame may be received in a particular beam receiving direction of the first network device corresponding to the particular sector receiving direction.

In this manner, functionality 400 of FIG. 4 may provide multi-band directional scanning. For instance, functionality 400 may include, receiving, by a first radio of a first network device operating a first frequency band below the mmWave, a probe request (at block 405), and transmitting, by a second radio of the first network device operating at a second frequency band within the mmWave, a probe response in each sector transmitting direction (at block 415), based on determining that the probe request does not indicate a particular sector transmitting direction (at block 410.) Thus, functionality 400 avoids requiring transmitting, by the first network device via a frequency band within the mmWave, a beacon frame for every sector scanning direction of the second network device. Moreover, functionality 400 allows transmitting, by the second radio of the first network device operating at the second frequency band, the probe response in each of one or more sector directions, wherein the second network device receives one or more probe responses in the particular sector scanning direction, thereby allowing one or more probe responses to be received by the second network device in the particular sector scanning direction, rather than requiring one or more probe responses to be received in every sector scanning direction of the second network device. Thus, examples described herein may provide may reduce scan times as compared to passive directional scanning.

Moreover, functionality 400 may include receiving, by a first radio of a first network device operating a first frequency band below the mmWave, a probe request (at block 405), and transmitting, by a second radio of the first network device operating at a second frequency band within the mmWave, a probe response in a particular sector transmitting direction (at block 420), based on determining that the probe request indicates the particular sector transmitting direction (at block 410). Thus, functionality 400 allows transmitting, by the second radio of the first network device, the probe response in the particular sector transmitting direction, rather than requiring transmitting the probe response in every sector transmitting direction of the second network device.

Figure 5:
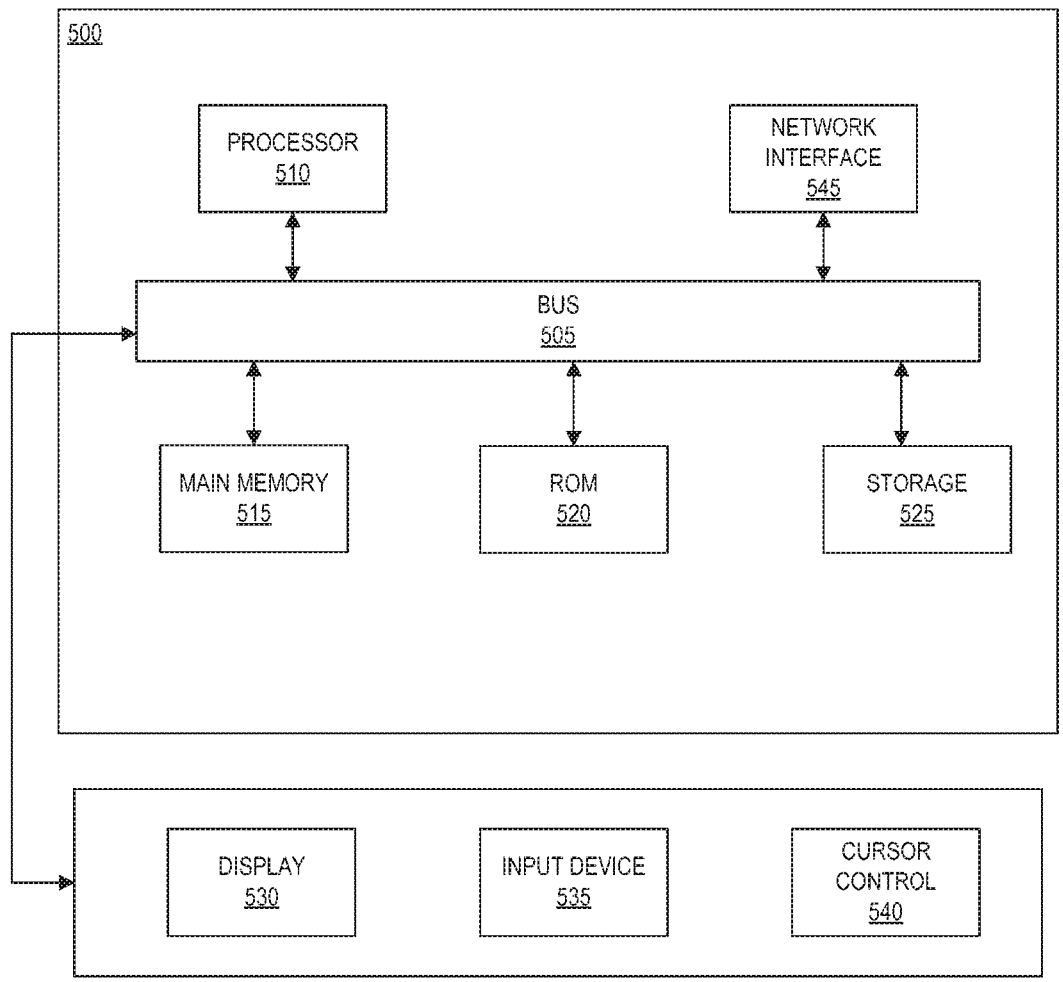
FIG. 5 is a block diagram of an example computer system in which various embodiments described herein of multi-band directional scanning may be implemented.

FIG. 5 is a block diagram of an example computer system 500 in which various embodiments described herein may be implemented.

Computer system 500 includes bus 505 or other communication mechanism for communicating information, at least one hardware processor 510 coupled with bus 505 for processing information. At least one hardware processor 510 may be, for example, at least one general purpose microprocessor.

Computer system 500 also includes main memory 515, such as random access memory (RAM), cache, other dynamic storage devices, or the like, or a combination thereof, coupled to bus 505 for storing information and one or more instructions to be executed by at least one processor 510. Main memory 515 also may be used for storing temporary variables or other intermediate information during execution of one or more instructions to be executed by at least one processor 510. Such one or more instructions, when stored on storage media accessible to at least one processor 510, render computer system 500 into a special-purpose machine that is customized to perform the operations specified in the one or more instructions.

Computer system 500 may further include read only memory (ROM) 520 or other static storage device coupled to bus 505 for storing static of one or more instructions to be executed by at least one processor 510. Such one or more instructions, when stored on storage media accessible to at least one processor 510, render computer system 500 into a special-purpose machine that is customized to perform the operations specified in the one or more instructions.

Computer system 500 may further include information and one or more instructions for at least one processor 510. At least one storage device 525, such as a magnetic disk, optical disk, or USB thumb drive (Flash drive), or the like, or a combination thereof, may be provided and coupled to bus 505 for storing information and one or more instructions.

Computer system 500 may further include display 530 coupled to bus 505 for displaying a graphical output to a user. The computer system 500 may further include input device 535, such as a keyboard, camera, microphone, or the like, or a combination thereof, coupled to bus 505 for providing an input from a user. Computer system 500 may further include cursor control 540, such as a mouse, pointer, stylus, or the like, or a combination thereof, coupled to bus 505 for providing an input from a user.

Computer system 500 may further includes at least one network interface 545, such as a network interface controller (NIC), network adapter, or the like, or a combination thereof, coupled to bus 505 for connecting computer system 500 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 based on (e.g., in response to) at least one processor 510 executing one or more sequences of one or more instructions contained in main memory 515. Such one or more instructions may be read into main memory 515 from another storage medium, such as at least one storage device 525. Execution of the sequences of one or more instructions contained in main memory 515 causes at least one processor 510 to perform the process steps described herein. In alternative embodiments, hard-wired circuitry may be used in place of or in combination with software instructions.

In examples described herein, the term "Wi-Fi" is meant to encompass any type of wireless communications that conforms to any IEEE 802.11 standards, whether 802.11ac, 802.11ad, 802.11ay, 802.11ax, 802.11g, etc. The term "Wi-Fi" is currently promulgated by the Wi-Fi Alliance®. Any products tested and approved as "Wi-Fi Certified" (a registered trademark) by the Wi-Fi Alliance® are certified as interoperable with each other, even if they are from different manufacturers. A user with a "Wi-Fi Certified" (a registered trademark) product can use any brand of WAP with any other brand of client hardware that also is certified. Typically, however, any Wi-Fi product using the same radio frequency band (e.g., 5 GHz band for 802.11ac) will work with any other, even if such products are not "Wi-Fi Certified." The term "Wi-Fi" is further intended to encompass future versions and/or variations on the foregoing communication standards. Each of the foregoing standards is hereby incorporated by reference.

In examples described herein, "throughput" refers to a rate of successful data transmission across a communication link. Throughput may depend on a bandwidth of the communication link, a maximum rate of data transmission (i.e., peak data rate or peak bit rate) across the communication link, or a combination thereof. Moreover, throughput may depend on an amount of data packet loss during data transmission across the communication link. For example, a network device may increase throughput, and thereby improve performance, by increasing bandwidth of a communication link, reducing data packet loss during data transmission across the communication link, or a combination thereof.

In examples described herein, "beamwidth" refers to an area for which a transmitted signal has a certain level of power. In some examples, beamwidth is expressed as an angle between two points of a transmitted signal along an azimuth plane, wherein the transmitted signal has a certain level of power within that angle. In some examples, beamwidth may correspond to the half power beamwidth of a transmitted signal. As used herein, half power beamwidth corresponds to the angle between two points of a transmitted signal along an azimuth plane wherein the power of the transmitted signal maintains a power of at least 50% (−3 dB) from the point of maximum radiation.

In examples described herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

The invention claimed is:

1. A first network device, comprising:
 a first radio operating at a first frequency band below a millimeter-wave (mmWave);
 a second radio operating at a second frequency band within the mmWave;
 a first processing resource; and
 a first machine-readable storage medium comprising instructions executable by the first processing resource to:
  receive, by the first radio, a probe request from a second network device indicating a protocol and a particular sector scanning direction of the second network device;
  receive, by the second radio, an association request from the second network device; and
  in response to the protocol indicated by the probe request, transmit, by the second radio, a probe response in each of one or more sector transmitting directions and an association response to the second network device, wherein the second network device receives one or more probe responses in the particular sector scanning direction.

2. The first network device of claim 1, wherein the processing resource is further configured to:
 receive, by the second radio, an authentication request from the second network device, wherein the authentication request is in response to the one or more probe responses received by the second network device in the particular sector scanning direction; and
 in response to the authentication request, transmit, by the second radio, an authentication response to the second network device.

3. The first network device of claim 1,
wherein the association request is in response to the one or more probe responses received by the second network device in the particular sector scanning direction, and
wherein the association response establishes a connection with the second network device.

4. The first network device of claim 3, wherein the processing resource is further configured to:
based on an established connection with the second network device, transmit, by the second radio, a data frame to the second network device.

5. The first network device of claim 3, wherein the processing resource is further configured to:
based on an established connection with the second network device, receive, by the second radio, a data frame from the second network device.

6. The first network device of claim 1, wherein the probe request indicates a particular scanning channel of the second network device, a particular scanning duration of the second network device, or a combination thereof.

7. The first network device of claim 1, wherein the sector scanning direction of the second network device corresponds to a plurality of beam scanning directions of the second network device.

8. The first network device of claim 1, wherein each of the one or more sector transmitting directions corresponds to a plurality of beam transmitting directions.

9. The first network device of claim 1, wherein the first frequency band comprises a 5 GHz band.

10. The first network device of claim 1, wherein the second frequency band comprises a 60 GHz band.

11. The first network device of claim 1, wherein the second radio comprises a phased array antenna.

12. The first network device of claim 1, wherein the probe request indicates a particular transmitting direction of one or more sector transmitting directions.

13. A system, comprising:
the first network device of claim 1; and
the second network device, comprising:
a third radio operating at the first frequency band;
a fourth radio operating at the second frequency band;
a second processing resource; and
a second machine-readable storage medium comprising instructions executable by the second processing resource to:
transmit, by the third radio, the probe request;
receive, by the fourth radio, the one or more probe responses in the particular sector scanning direction.

14. A method, comprising:
receiving, by a first radio of a first network device operating at a first frequency band below a millimeter-wave (mmWave), a probe request from a second network device indicating a protocol and a particular sector scanning direction of the second network device;
receiving, by a second radio of the first network device, an association request from the second network device;
in response to the protocol indicated by the probe request, transmitting, by a second radio of the first network device operating at a second frequency band within the mmWave, a probe response in each of one or more sector transmitting directions and an association response to the second network device, wherein the second network device receives one or more probe responses in the particular sector scanning direction.

15. The method of claim 14, further comprising:
receiving, by the second radio of the first network device, an authentication request, wherein the authentication request is in response to the one or more probe responses received by the second network device in the particular sector scanning direction; and
in response to the authentication request, transmitting, by the second radio of the first network device, an authentication response in a particular sector transmitting direction.

16. The method of claim 14,
wherein the association request is in response to the one or more probe responses received by the second network device in a particular sector scanning direction, and
wherein the association response is transmitted in a particular sector transmitting direction.

17. The method of claim 16, further comprising:
based on an established connection between the first and second network devices, transmitting, by the second radio of the first network device, a data frame in a particular sector transmitting direction.

18. The method of claim 16, further comprising:
determining the particular sector transmitting direction based on a determination of a quality of the one or more probe responses received by the second network device in the particular sector scanning direction.

19. The method of claim 16, wherein the particular sector scanning direction of the second network device corresponds to a plurality of beam scanning directions of the second network device.

20. An article comprising at least one non-transitory machine-readable storage medium comprising instructions executable by the at least one processing resource of a first network device to:
receive, by a first radio of the first network device operating at a first frequency band below a millimeter-wave (mmWave), a probe request from a second network device indicating a protocol and a particular sector scanning direction of the second network device;
receive, by a second radio of the first network device, an association request from the second network device;
in response to the protocol indicated by the probe request, transmit, by a second radio of the first network device operating at a second frequency band within the mmWave, a probe response in each of one or more sector transmitting directions and an association response to the second network device, wherein the second network device receives one or more probe responses in the particular sector scanning direction.

* * * * *